US007450363B2

(12) United States Patent
Hughes

(10) Patent No.: US 7,450,363 B2
(45) Date of Patent: Nov. 11, 2008

(54) COMBINATION ELECTRICAL CONNECTOR

(75) Inventor: David Charles Hughes, Rubicon, WI (US)

(73) Assignee: Cooper Technologies Company, Houston, TX (US)

(*) Notice: Subject to any disclaimer, the term of this patent is extended or adjusted under 35 U.S.C. 154(b) by 133 days.

(21) Appl. No.: 11/177,502

(22) Filed: Jul. 11, 2005

(65) Prior Publication Data

US 2007/0097601 A1 May 3, 2007

(51) Int. Cl.
*H02H 1/00* (2006.01)

(52) U.S. Cl. .................................................... 361/118

(58) Field of Classification Search ................. 361/118, 361/117; 439/181, 466, 468, 921
See application file for complete search history.

(56) References Cited

U.S. PATENT DOCUMENTS 4,161,012 A * 7/1979 Cunningham ............... 361/128
5,936,825 A * 8/1999 DuPont ...................... 361/127
6,332,785 B1 12/2001 Muench, Jr. et al.
6,338,637 B1 * 1/2002 Muench et al. ............. 439/201
6,504,103 B1 1/2003 Meyer et al.

OTHER PUBLICATIONS

"Installation & Operation Instructions 168ALR, Access Port Loadbreak Elbow Connectors"; *Elastimold IS-168ALR* (*Rev C*); pp. 1-5; (Feb. 1, 1994).

"Operating Instructions 200TC-2"; *Elastimold IS-200TC*(*Rev-A*); pp. 1-2; (Feb. 26, 1995).

"Surge Arresters"; *Elastimold Catalog*; pp. 26-27; (2001).

"Surge Arresters, Metal Oxide Varistor Elbow (M.O.V.E.™) Surge Arrester Electrical Apparatus 235-65"; *Cooper Power Systems*; pp. 1-4; Dec. 2003.

"Surge Arresters, Metal Oxide Elbow Surge Arrester Electrical Apparatus 235-65"; *Cooper Power Systems*; pp. 1-4; Jan. 1991.

"Surge Arresters, Metal Oxide Varistor (MOV) Parking Stand Surge Arrester Electrical Apparatus 235-68"; *Cooper Power Systems*; pp. 1-3; Apr. 2002.

"INJPLUG35, 35 kV Amp Loadbreak Injection Plug Operating and Installation Instructions"; *Cooper Power Systems*; p. 1; (Sep. 2002).

"Loadbreak Apparatus Connectors, 200A 15 kV Class Loadbreak Elbow Connector, Electrical Apparatus 500-10"; *Copper Power Systems*pp. 1-4; (Feb. 2004).

(Continued)

*Primary Examiner*—Michael J Sherry
*Assistant Examiner*—Christopher J Clark
(74) *Attorney, Agent, or Firm*—Fish & Richardson P.C.

(57) ABSTRACT

An electrical connector for connecting to an electrical apparatus within a high power circuit includes an electrical contact and an enclosure. The electrical contact is configured to connect to a bushing of an electrical apparatus within a high power circuit. The electrical contact extends along a first direction from a coupling region. The enclosure extends from the coupling region in a second direction that is nonparallel to the first direction. The enclosure includes two or more electrical devices, with each electrical device being connected to the electrical contact within the coupling region and providing a current path from the electrical apparatus to at least one external coupling device within the high power circuit.

27 Claims, 9 Drawing Sheets

OTHER PUBLICATIONS

"Loadbreak Apparatus Connectors, 200 A 15 kV and 25 kV Class Elbow Installation Instructions, Service Information S500-10-1"; *Cooper Power Systems*; pp. 1-4; (Feb. 2001).
"Loadbreak Apparatus Connectors, 200 A 15kV Class Loadbreak Bushing Insert 500-12"; *Cooper Power Systems*; pp. 1-2; (Nov. 1995).
"Loadbreak Appartus Connectors, 200 A 15kV Class Loadbreak Rotatable Feedthru Insert; Electrical Apparatus 500-13"; *Cooper Power Systems*; pp. 1-2; (Apr. 2001).
"Loadbreak Appatus Connectors, 200 A 25kV Class—Expanded Range Loadbreak Elbow Connector, Electrical Apparatus 500-28"; *Cooper Power Systems*; pp. 1-4; (Jan. 2004).
"Loadbreak Appartus Connectors, 200 A 25 kV Class Rotatable Feedthru Insert, Electrial Apparatus 500-30"; *Cooper Power Systems*; pp. 1-2; (Jun. 1999).
"Loadbreak Appartus Connectors, 200 A 35 kV Class Three-Phase Loadbreak Injection Elbow Installation Instructions, Service Information S500-55-2"; *Cooper Power Systems*; pp. 1-6; (Apr. 1999).

* cited by examiner

COMBINATION ELECTRICAL CONNECTOR

CROSS REFERENCE TO RELATED APPLICATIONS

This description relates to U.S. application Ser. No. 11/088,863, filed Mar. 25, 2005, which is incorporated herein by reference.

TECHNICAL FIELD

This description relates to a combination electrical connector.

BACKGROUND

Electrical connectors are used to connect electrical transmission and distribution equipment within a distribution system.

SUMMARY

In one general aspect, an electrical connector for connecting to an electrical apparatus within a high power circuit includes an electrical contact and an enclosure. The electrical contact is configured to connect to a bushing of an electrical apparatus within a high power circuit. The electrical contact extends along a first direction from a coupling region. The enclosure extends from the coupling region in a second direction that is nonparallel to the first direction. The enclosure includes two or more electrical devices, with each electrical device being connected to the electrical contact within the coupling region and providing a current path from the electrical apparatus to at least one external coupling device within the high power circuit.

Implementations may include one or more of the following features. For example, at least one of the electrical devices may exit the enclosure outside of the coupling region. At least one of the electrical devices may include an insulated conductor. Another of the electrical devices may include an insulated conductor that provides a second current path from the electrical apparatus to the external coupling device.

At least one of the electrical devices may include a protective device and the protective device may include a surge arrester. Another of the electrical devices may include an insulated conductor and the surge arrester may be electrically connected in parallel with the insulated conductor.

The second direction may be perpendicular to the first direction.

The electrical connector may also include a semiconductive insert that surrounds the coupling region. The electrical connector may include an insulating body that extends along the second direction within the enclosure and through the coupling region. The insulating body may extend from the coupling region along the first direction and around the electrical contact. The insulating body may define a cavity that extends along the first direction and around the electrical contact, with the cavity being shaped to receive the bushing. The electrical connector may also include a conductive shell that surrounds the insulating body. The electrical connector may include an adapter that is received within the enclosure and has an internal geometry that is shaped to receive the electrical devices.

In another general aspect, an electrical connector connects an electrical apparatus to at least two devices that couple to two external coupling devices within a high power circuit. The electrical connector includes an electrical contact and an enclosure. The electrical contact is configured to couple a bushing of the electrical apparatus. The electrical contact extends along a first direction from a coupling region. The enclosure extends from the coupling region along a second direction that is nonparallel to the first direction. The enclosure includes at least two insulated electrical conductors that are electrically connected to the electrical contact and that are configured to each connect to one of the two external coupling devices within the high power circuit.

Implementations may include one or more of the following features. For example, the electrical connector may include a semiconductive insert that surrounds the coupling region. The electrical connector may include an insulating body that extends along the second direction within the enclosure and through the coupling region. The insulating body may extend from the coupling region along the first direction and around the electrical contact. The insulating body may define a cavity that extends along the first direction and around the electrical contact, with the cavity being shaped to receive the bushing. The electrical connector may also include a conductive shell that surrounds the insulating body.

In another general aspect, an electrical connector connects an electrical apparatus within a high power circuit to an electrical implement coupled to the high power circuit and provides overvoltage protection to the electrical implement. The connector includes an electrical contact and an enclosure. The electrical contact is configured to connect to a bushing of an electrical apparatus within a high power circuit. The enclosure includes an insulated electrical conductor that is electrically connected to the electrical contact within a coupling region, and a surge arrester within the enclosure. The surge arrester is electrically connected to the electrical contact within the coupling region to divert a current surge away from an electrical implement coupled to the electrical conductor.

Implementations may include one or more of the following features. For example, the electrical connector may include a semiconductive insert that surrounds the coupling region. The electrical connector may include an insulating body that extends within the enclosure and through the coupling region. The insulating body may extend from the coupling region to define a cavity that surrounds the electrical contact, the cavity being shaped to receive the bushing. The electrical connector may include a conductive shell that surrounds the insulating body.

A distance between a line terminal of the surge arrester and the electrical conductor may be less than approximately three inches. A distance between a ground terminal of the surge arrester and the electrical conductor may be less than approximately six inches.

In another general aspect, an electrical apparatus within a high power circuit is connected to an external coupling device that connects to an electrical implement. An electrical contact is extended along a first direction relative to the electrical apparatus. The electrical contact is connected to a bushing of the electrical apparatus within the high power circuit. An enclosure is extended from the electrical contact along a second direction that is nonparallel with the first direction. At least two current paths are provided within the enclosure. The current paths are from the electrical contact to the external coupling device connected to the electrical implement.

In another general aspect, an electrical connector connects to an electrical apparatus within a high power circuit. The electrical connector includes a means for connecting to a bushing of the electrical apparatus within the high power circuit, and a means for housing two or more electrical devices. The means for connecting extends along a first direction from a coupling region. The means for housing extends from the coupling region in a second direction that is nonparallel to the first direction. Each electrical device is connected to the electrical contact within the coupling region and provides a current path from the electrical apparatus to at least one external coupling device within the high power circuit.

In another general aspect, an electrical connector connects to an electrical apparatus within a high power circuit. The electrical connector includes an electrical contact extending from a coupling region, an enclosure extending from the coupling region, and an adapter received within the enclosure. The electrical contact is configured to connect to a bushing of an electrical apparatus within a high power circuit. The adapter includes two or more electrical devices, with each electrical device being connected to the electrical contact within the coupling region and providing a current path from the electrical apparatus to at least one external coupling device within the high power circuit.

Implementations may include one or more of the following features. For example, the adapter may have an internal geometry that is shaped to receive the electrical devices.

Aspects of the combination electrical connector can include one or more of the following advantages. For example, the combination electrical connector can be used to connect an electrical implement within a distribution system to an existing electrical apparatus that does not have an open bushing. The combination electrical connector does not need to be de-energized, which permits the electrical implement to be connected while the electrical apparatus remains energized. Moreover, use of the combination electrical connector avoids the need to remove a loadbreak bushing well insert and replace the loadbreak bushing well insert with a loadbreak feed-thru insert and two loadbreak elbows. The combination electrical connector can perform a loadbreak operation to de-energize an electrical apparatus while keeping power flowing to all other electrical implements upstream and downstream from the electrical apparatus.

The combination electrical connector can be used in those situations in which two electrical implements need to be connected to an electrical apparatus that includes only a single bushing. The combination electrical connector can be used in those situations in which one electrical implement needs to be connected to an electrical apparatus that includes a single bushing and overvoltage protection is required for the electrical implement.

The combination electrical connector replaces one or more of a loadbreak elbow, a feed-thru insert, a separate elbow surge arrester, or a bushing surge arrester. Thus, the combination electrical connector conserves space in the region near the bushing of the electrical apparatus. Typically, the bushing of the electrical apparatus and bushings of other electrical apparatuses are aligned within and protrude from a plate (referred to as a "frontplate") to form an array of bushings. In the frontplate design, the combination electrical connector conserves space along a surface that is parallel to the frontplate and along a direction perpendicular to the frontplate surface (also referred to as a "stacking dimension").

Moreover, the combination overvoltage protection electrical connector may provide improved performance because resistance and inductance in the line and ground leads from the surge arrester to the electrical conductor are reduced due to a decrease in the lengths of the line lead and the ground lead.

The electrical connector includes an adapter that has an internal geometry that is shaped to receive the electrical devices and has an external geometry that is shaped to be received within the enclosure. The enclosure only needs to be formed with a single internal geometry to receive the adapter. Because of this, manufacturing and installation costs are reduced. In particular, the manufacturer or installer would only need to conform the inner geometry of the adapter to the different configurations of the electrical devices. Thus, when there is a need to replace the electrical devices with differently shaped electrical devices, the manufacturer or installer would simply remove the adapter from the enclosure, find or make another adapter that is shaped to conform to the other electrical devices but that fits within the current enclosure, and insert the other adapter into the enclosure. There is no need to replace the enclosure or the electrical connector to replace the electrical devices within the electrical connector with differently shaped electrical devices. Additionally, money is saved during manufacture because tooling inventory is reduced since the manufacturer would only need a single set of tools for making the enclosure, which is the more complex and expensive part of the electrical connector to tool and mold.

Other features will be apparent from the description, the drawings, and the claims.

DESCRIPTION OF DRAWINGS

Like reference symbols in the various drawings may indicate like elements.

DETAILED DESCRIPTION

Figure 1A:
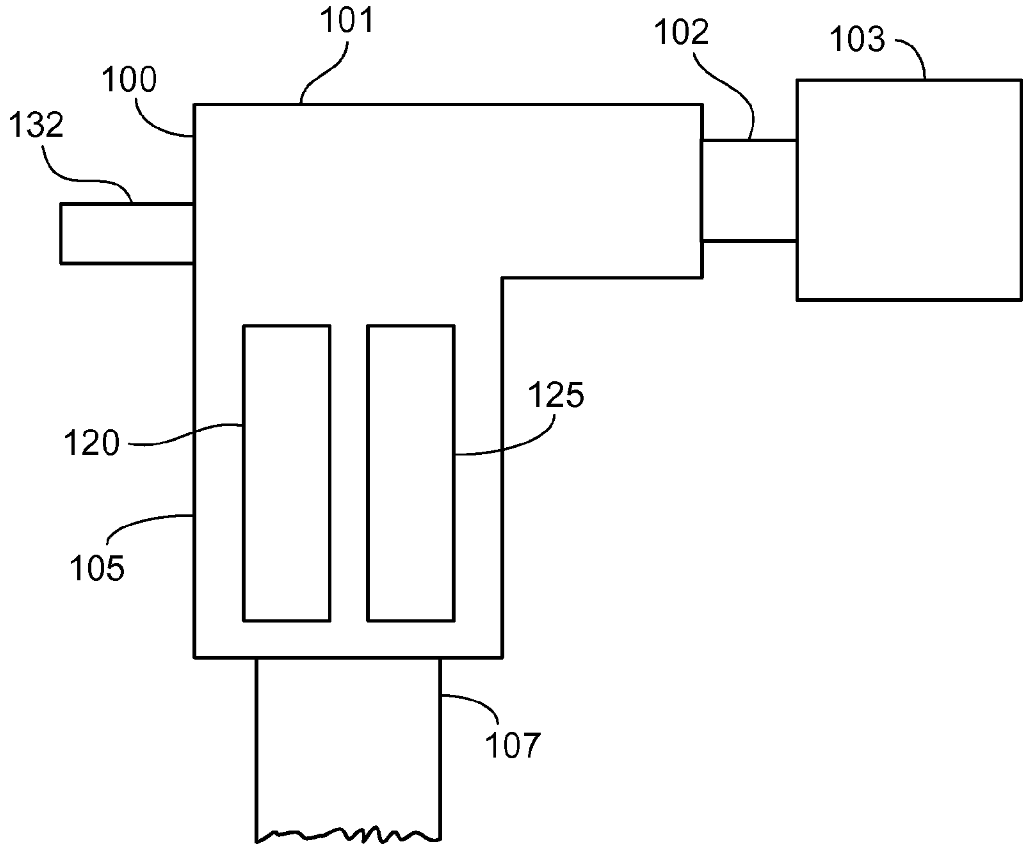
FIG. 1A is a block diagram of a combination electrical connector that connects an electrical apparatus to a coupling device that is connected to an electrical implement.
Figure 1B:
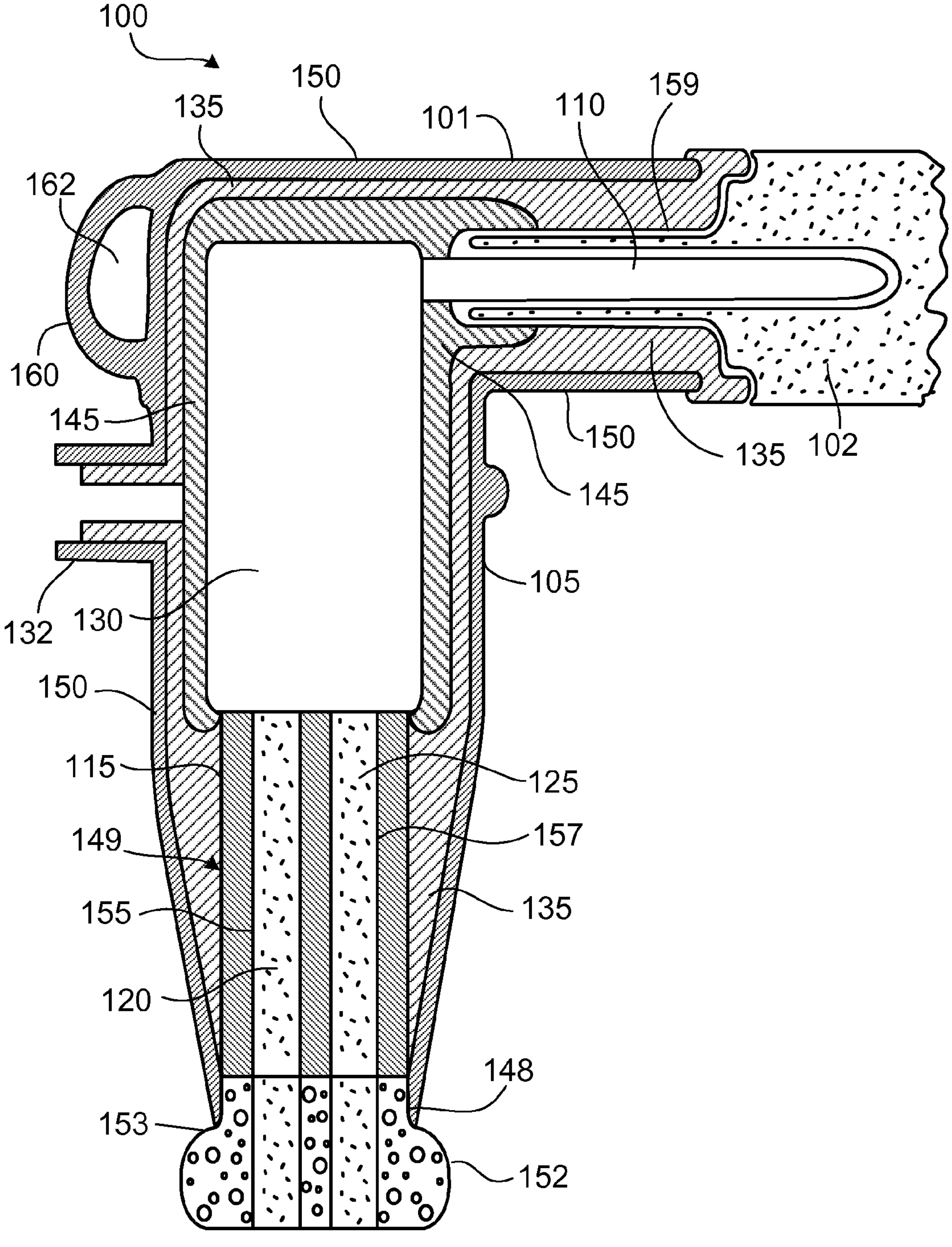
FIG. 1B is a side cross sectional view of the combination electrical connector of FIG. 1A.

Referring to FIGS. 1A and 1B, a combination electrical connector 100 is used in those situations in which two electrical devices 120, 125 need to be connected to an electrical apparatus 103 that includes only a single bushing 102. The electrical apparatus 103 may be a source of energy such as a power source or a transformer. The electrical devices 120, 125 are connected to one or more electrical coupling devices 107 within a high power circuit and the one or more coupling devices 107 connect to one or more electrical implements.

The two devices 120, 125 may be passive or active electrical devices. For example, the two devices 120, 125 may be two cables, which are passive electrical devices having an electrical conductor surrounded by an insulative barrier, as discussed below with respect to FIGS. 2A and 2B. As another example, the two devices 120, 125 may be a cable and a surge arrester, which is an active electrical device, as discussed below with respect to FIGS. 3A and 3B. In any case, the devices 120, 125 are rated for use in high power circuits. For example, the devices 120, 125 may be rated for 0-36.6 Kilovolts and up to 200 Amps.

The combination electrical connector 100 includes a housing 101 having a coupling region 130, an insulative body 135 surrounding the coupling region 130, and a conductive shell 150 surrounding the insulative body 135. The electrical connector 100 includes an electrical contact 110 that generally extends along a first direction from the coupling region 130, and an enclosure 105 that generally extends from the coupling region 130 along a second direction that is generally nonparallel to the first direction. The enclosure 105 defines a space that provides more than one current path from the electrical apparatus 103 to the one or more coupling devices 107 through the electrical devices 120, 125. The electrical contact 110 is configured to connect directly to the bushing 102 of the electrical apparatus. The enclosure 105 receives an adapter 115 that is configured to receive the two devices 120, 125. The conductive shell 150 includes an opening 148 for receiving the adapter 115. The coupling region 130 includes electrical components that couple the electrical contact 110 to the two devices 120, 125. The adapter 115 is designed to conform to the shape of the devices 120, 125 that are inserted into the connector 100. In this way, the enclosure 105 and the housing 101 can be designed with a single internal geometry that accepts the adapter 115 and the adapter 115 can be designed with different internal geometries, depending on the shape of the devices 120, 125.

The body 135 surrounds and insulates the coupling region 130, the electrical contact 110, and the devices 120, 125. The housing 101 also includes a semiconductive insert such as a faraday cage 145, which has the same electric potential as the devices 120, 125 and the electrical contact 110 and which surrounds the coupling region 130. The faraday cage 145 prevents corona discharges within the coupling region 130. As a result of this configuration, the connector 100, through the coupling region 130, may be disconnected from the electrical apparatus to create a break in the circuit.

The external conductive shell 150 may be made of a conductive elastomeric material, such as, for example, a terpolymer elastomer made from ethylene-propylene diene monomers loaded with carbon, and/or other conductive materials. One example of a conductive material is ethylene propylene terpolymer (EPT) loaded with carbon or ethylene propylene diene monomer (EPDM) loaded with carbon. The conductive shell 150 may be pre-molded in the shape of an elbow to include an opening 148 for receiving the devices 120, 125.

The body 135 is made from an insulative material such as, for example, EPDM or insulative rubber. The body 135 occupies most of the space between the coupling region 130 and the conductive shell 150. In this way, the body 135 forms a dielectric and electrically insulative barrier between the high voltage components and the conductive shell 150.

The body 135 includes an opening 149 for receiving the adapter 115 and an opening 159 for enclosing the contact 110 and for receiving the bushing 102 of the electrical apparatus. The adapter 115 includes openings 155, 157 for receiving, respectively, the devices 120, 125. The openings 155, 157 are sized just slightly smaller than the devices 120, 125 to create an interference fit between the adapter and the devices 120, 125.

In one implementation, the adapter 115 may also include a conductive shell or plug 152 that fits within the opening 148 and contacts the external conductive shell 150. The conductive plug 152 is made of a conductive rubber, such as a rubber loaded with carbon or another appropriate conductive material. For example, the conductive plug 152 may be made of EPDM loaded with carbon. The conductive plug 152 is physically attached (by, for example, chemical bonding or glue) to the adapter 115. As shown, the conductive plug 152 is shaped to receive the devices 120, 125 and may include a rim 153 that remains outside of the opening 148. The rim 153 enables a user to more easily reposition the adapter 115 and prevents the adapter 115 from moving any further into the body 135.

In another implementation, the insulative body 135 and the adapter 115 may be manufactured as one integral unit. In this implementation, the conductive plug 152 would be integral with the conductive shell 150.

The connector 100 also includes a pull device 160 coupled to the conductive shell 150 and defining an eye 162. A stick (not shown) is shaped to lock with the eye 162 of the pull device 160. When the stick is locked to the pull device 160, the operator manipulates the stick to withdraw the connector 100 from the bushing of the electrical apparatus during a loadbreak operation. This permits the operator to manipulate the connector 100 from a safe distance.

The connector 100 may also include an access port 132 extending along a third direction from the coupling region 130 and the enclosure 105. While the third direction is shown as being parallel to the first direction and perpendicular to the second direction, the third direction also may be nonparallel to the first and second directions. The access port 132 provides access to the coupling region 130.

Figure 2A:
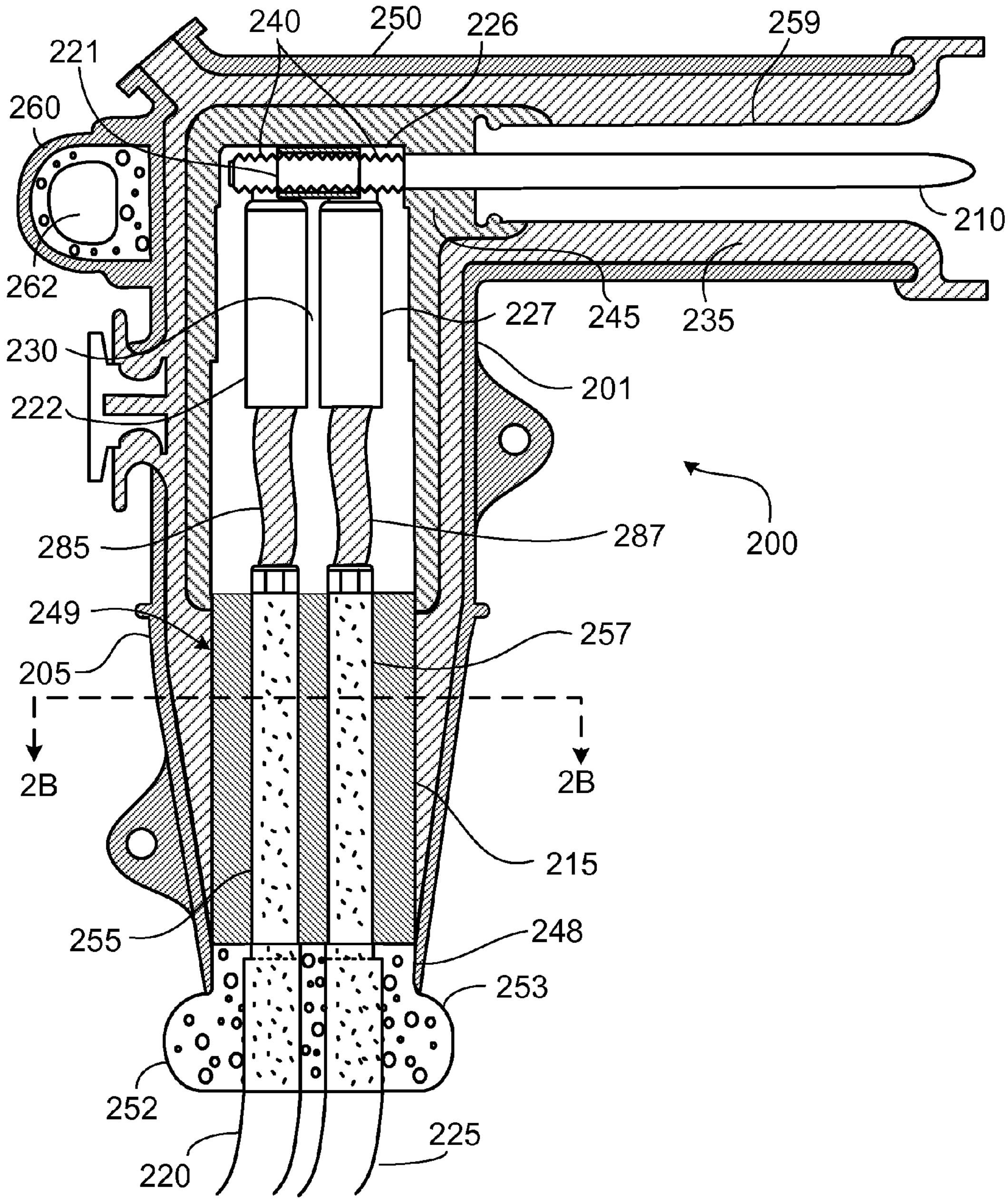
FIG. 2A is a side cross sectional view of a combination electrical connector.
Figure 2B:
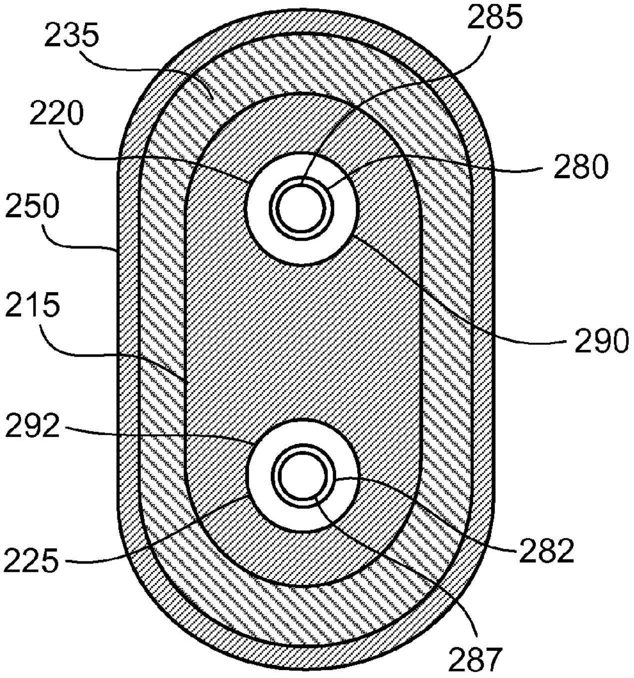
FIG. 2B is a cross sectional view of the connector of FIG. 2A taken along line 2A-2A.

Referring to FIGS. 2A and 2B, in a combination electrical connector 200, the devices 120, 125 are two electrical cables 220, 225. The combination electrical connector 200 is used in those situations in which two electrical implements need to be attached to the single bushing 102 of the electrical apparatus using an electrical contact 210. As shown in this implementation, the cables 220, 225 are coaxial. Thus, as shown in FIG. 2B, each of the cables 220 and 225 includes, respectively, a conductive shield 280, 282 wrapped around a center conductor 285, 287, and an insulative sleeve 290, 292 wrapped around the conductive shield 280, 282.

The connector 200 includes a housing 201 having a coupling region 230, an insulative body 235 surrounding the coupling region 230, and a conductive shell 250 surrounding the insulative body 235. The electrical contact 210 extends along a first direction from the coupling region 230 and an enclosure 205 extends along a second direction that is generally perpendicular to the first direction. The enclosure 205 includes an adapter 215 that receives the two cables 220, 225 and feeds into the coupling region 230. The insulative body 235 includes an opening 249 shaped to receive the adapter 215.

The body 235 within the adapter 215 includes openings 255, 257 for receiving, respectively, the cables 220, 225. The coupling region 230 includes connective devices 222, 227 that electrically couple, respectively, to the conductors 285, 287 that extend from the cables 220, 225 within the coupling region 230. The connective devices 222, 227 may be crimp-type or compressive devices that make electrical contact with, respectively, the conductors 285, 287. The connective devices 222, 227 are made of any material that is conductive, such as, for example, copper. Within the coupling region 230, the connective devices 222, 227 include, respectively, threaded portions 221, 226, and the contact 210 includes a threaded portion 240 that mates with the threaded portions 221, 226 to enable effective electrical contact between the contact 210 and the conductors 285, 287.

The adapter 215 may also include a conductive shell or plug 252 that is shaped to fit within the opening 248 and to receive the cables 220, 225. Like the conductive plug 152, the conductive plug 252 includes a rim 253 that extends beyond the shell 250 to stabilize the conductive plug 252 and provide a way to grasp the conductive plug 252.

Figure 3B:
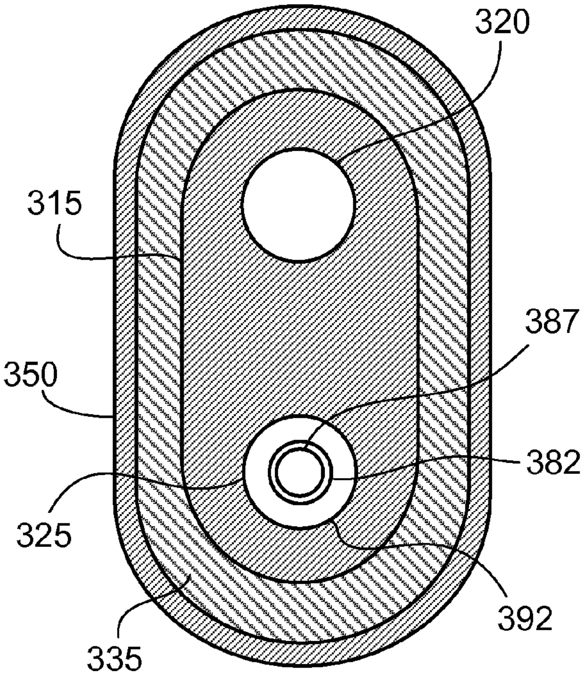
FIG. 3B is a cross sectional view of the connector of FIG. 3A taken along line 3A-3A.
Figure 3A:
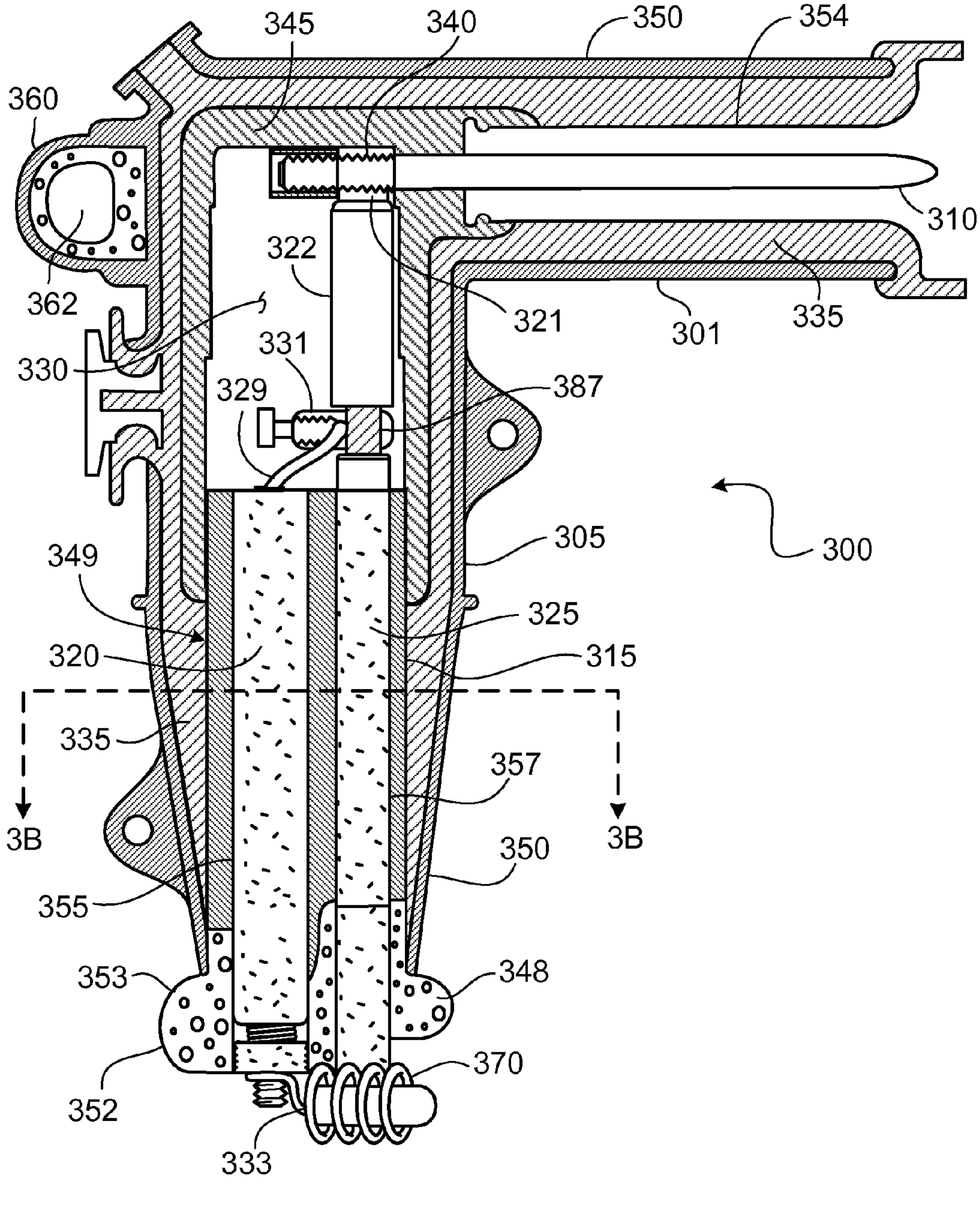
FIG. 3A is a side cross sectional view of a combination overvoltage protection electrical connector.

Referring to FIGS. 3A and 3B, in a combination overvoltage protection electrical connector 300, the devices 120, 125 are, respectively, a surge arrester 320 and an electrical cable 325. The combination electrical connector 300 is used in those situations in which a piece of electrical equipment (an electrical implement) is to be attached to the single bushing 102 of the electrical apparatus 103 through the coupling devices 107 and the connector 300, and in which overvoltage protection for the electrical implement is needed.

The connector 300 includes a housing 301 having a coupling region 330, an insulative body 335 surrounding the coupling region 330, and a conductive shell 350 surrounding the insulative body 335. The electrical contact 310 extends along a first direction from the coupling region 330, and an enclosure 305 extends along a second direction that is generally perpendicular to the first direction.

As shown in this implementation, the cable 325 is coaxial. Thus, as shown in FIG. 3B, the cable 325 includes a conductive shield 382 wrapped around a center conductor 387, and an insulative sleeve 392 wrapped around the conductive shield 382.

The surge arrester 320 is a protective device that safely shunts or diverts over-voltage surges, thereby protecting equipment coupled to the cable 325 from damage. When exposed to an over-voltage condition, the surge arrester 320 operates in a low impedance mode that provides a current path to electrical ground having a relatively low impedance. The surge arrester 320 otherwise operates in a high impedance mode that provides a current path to ground having a relatively high impedance. The impedance of the current path is substantially lower than the impedance of the equipment being protected by the surge arrester 320 when the surge arrester 320 is operating in the low-impedance mode, and is otherwise substantially higher than the impedance of the protected equipment. Upon completion of the over-voltage condition, the surge arrester 320 returns to operation in the high impedance mode. This prevents normal current at the system frequency from following the surge current to ground along the current path through the surge arrester 320.

The surge arrester 320 includes a line lead 329 and a ground lead 333. The line lead 329 makes electrical contact with the conductor 387 using, for example, a screw-type compression device 331 within the coupling region 330. The ground lead 333 makes electrical contact with neutral wires 370 that surround the insulative sleeve 392. In this way, the ground lead 333 provides the current path to ground through the neutral wires 370 of the cable 325. The leads 329, 333 may be made of any conductive material, such as, for example, flexible copper stranded woven wire. The strands 370 may or may not be covered with a protective cover such as a heat shrinkable or cold shrinkable material, depending on the humidity of the environment in which the connector 300 is being used. The protective cover would reduce the amount of moisture from entering the cable 325. Between the leads 329 and 333, the surge arrester 320 includes an array of electrical components that form a series electrical path between a pair of electrical terminals, and an elongated outer cover that houses the array and the terminals. The cover is made of an electrically insulating material. The electrical terminals are at opposite ends of the cover and connect the arrester between the line-potential conductor 387 and the electrical ground (at the neutral wires 370). The electrical elements of the array may be varistors, capacitors, thyristors, thermistors, resistors, terminals, spacers, or gap assemblies. The array may be formed with any different numbers of elements, and elements of different sizes or types.

The enclosure 305 includes an adapter 315 that receives the arrester 320 and the cable 325 and feeds into the coupling region 330. The body 335 within the adapter 315 includes openings 355, 357 for receiving, respectively, the surge arrester 320 and the cable 325.

The coupling region 330 includes a connective device 322 that electrically couples to the conductor 387 that extends from the cable 325 within the coupling region 330. The connective device 322 may be a crimp-type or a compressive device that makes electrical contact with the conductor 387. The connective device 322 is made of any material that is conductive, such as, for example, copper. Within the coupling region 330, the connective device 322 includes a threaded portion 321 and the contact 310 includes a threaded portion 340 that mates with the threaded portion 321 to enable effective electrical contact between the contact 310 and the conductor 387.

The adapter 315 includes a conductive shell or plug 352 that is shaped to fit within the opening 348 and to receive the surge arrester 320 and the cable 325. Like the conductive plug 152, the conductive plug 352 includes a rim 353 that extends beyond the shell 350 to stabilize the conductive plug 352 and to provide a way to grasp the conductive plug 352.

Because of the intimate configuration of the surge arrester 320 relative to the cable 325, the distance between the hot terminal of the surge arrester 320 and the conductor 387 is relatively short and the length of the line lead 329 can be made less than approximately three inches. Moreover, the total distance between the ground terminal of the surge arrester 320 and the neutral wires 370 is relatively short, thus reducing the length of the ground lead 333 to less than approximately six inches. Such relatively short lead lengths improve performance of any equipment coupled to the cable 325 by lowering the voltage impressed on the cable 325 and its insulation due to a reduction in resistance and inductance over the leads 329, 333.

Figure 4:
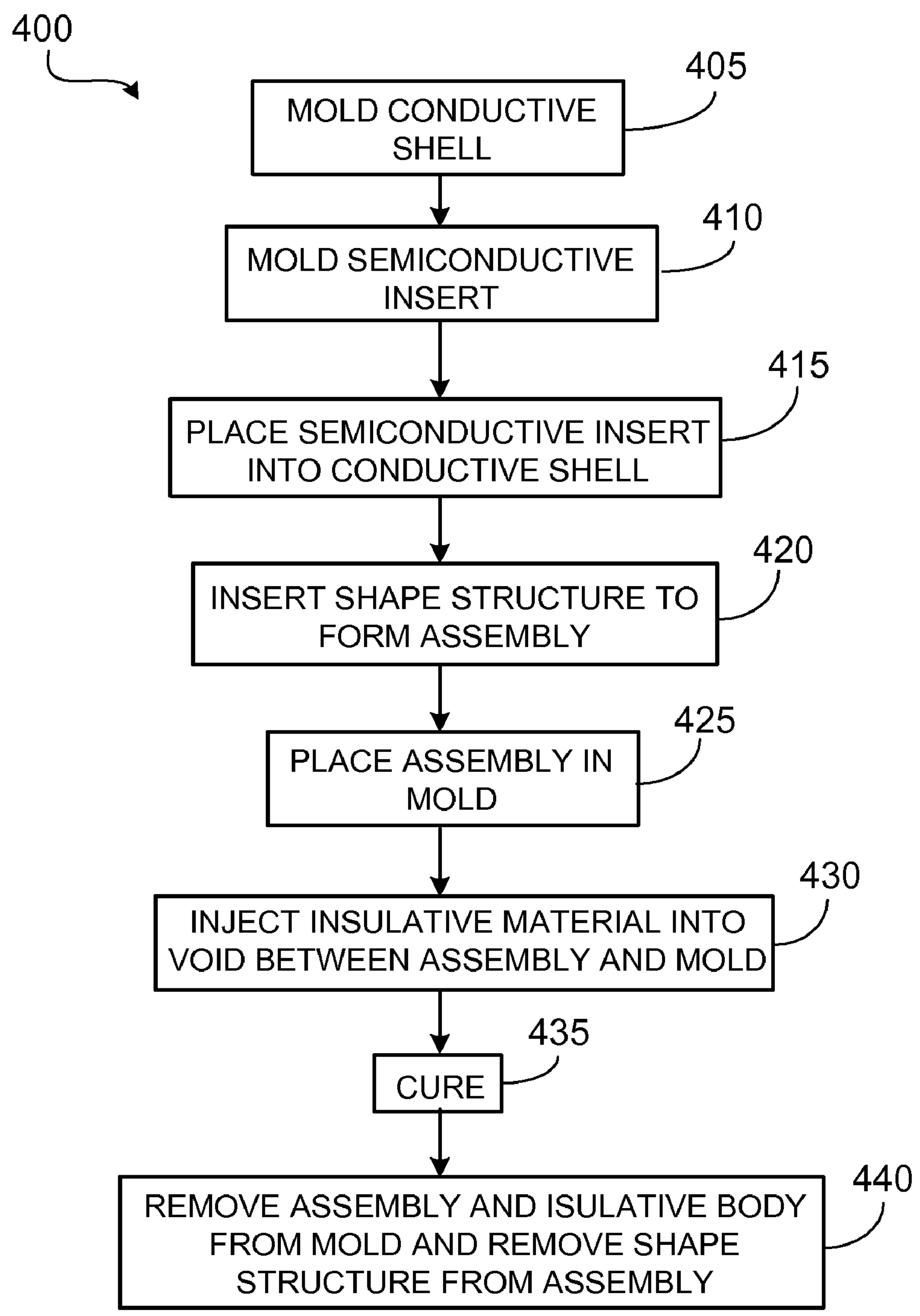
FIG. 4 is a flow chart of a procedure for manufacturing the combination electrical connector of FIG. 1A.

Referring to FIG. 4, a procedure 400 is performed to manufacture the electrical connector 100. Initially, the conductive shell 150 is molded (step 405). As discussed above, the conductive shell 150 may be molded from a conductive elastomeric material, such as, for example, semi-conductive EPDM. The conductive shell 150 may be molded in the shape of an elbow to include the opening 148 for receiving the adapter 115. Next, the semiconductive insert 145 is molded (step 410) and inserted into the conductive shell 150 (step 415). One or more shape structures (such as steel mandrels) are inserted into the conductive shell 150 to form a mold assembly (step 420). The shape structures are used to define the cavities within the conductive shell 150 for receiving other devices, such as the bushing 102 and the adapter 115. In particular, a first mandrel is inserted into the conductive shell 150 to define the bushing opening 159, and a second mandrel is inserted into the conductive shell 150 to define the adapter opening 149. Next, the mold assembly is placed in a mold and the mold is sealed (step 425). The material that forms the insulative body 135 is heated to form a liquid that is injected into the void between the mold assembly and the mold (step 430). The mold is heated to about 300-400° F. for about 5-25 minutes to cure the insulative body 135 (step 435). After curing, the mold is opened, the conductive shell 150, the insert 145, and the body 135 are removed from the mold and allowed to cool, and the shape structures are pulled out (step 440).

Figure 5:
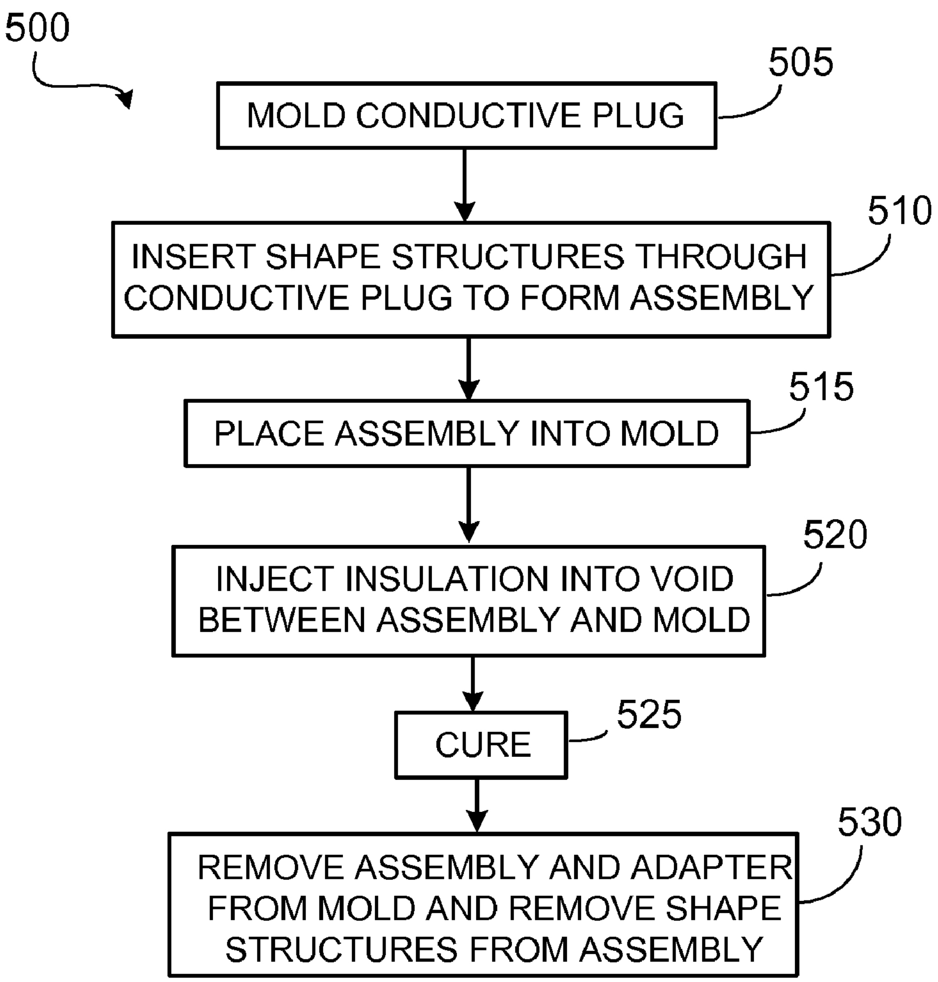
FIG. 5 is a flow chart of a procedure for manufacturing an adapter received within the combination electrical connector of FIG. 1A.

Referring to FIG. 5, a procedure 500 is performed to manufacture the adapter 115. Initially, if the adapter 115 includes the conductive plug 152, then the conductive plug 152 is molded (step 505). As discussed above, the conductive plug 152 may be molded from a semi-conductive EPDM. Next, one or more shape structures (such as steel mandrels) are inserted through the conductive plug 152 to form a mold assembly (step 510). The shape structures are used to define the openings 155, 157 within the adapter 115 for receiving the devices 120, 125, respectively. The mold assembly is placed in a mold (step 515), and the material that forms the adapter 115 is heated to form a liquid that is injected into the void between the mold assembly and the mold (step 520). The mold is heated to about 300-400° F. for about 5-25 minutes to cure the adapter 115 (step 525). After curing, the mold is opened, the adapter 115 is removed from the mold, and the shape structures are pulled out (step 530).

Figure 6:
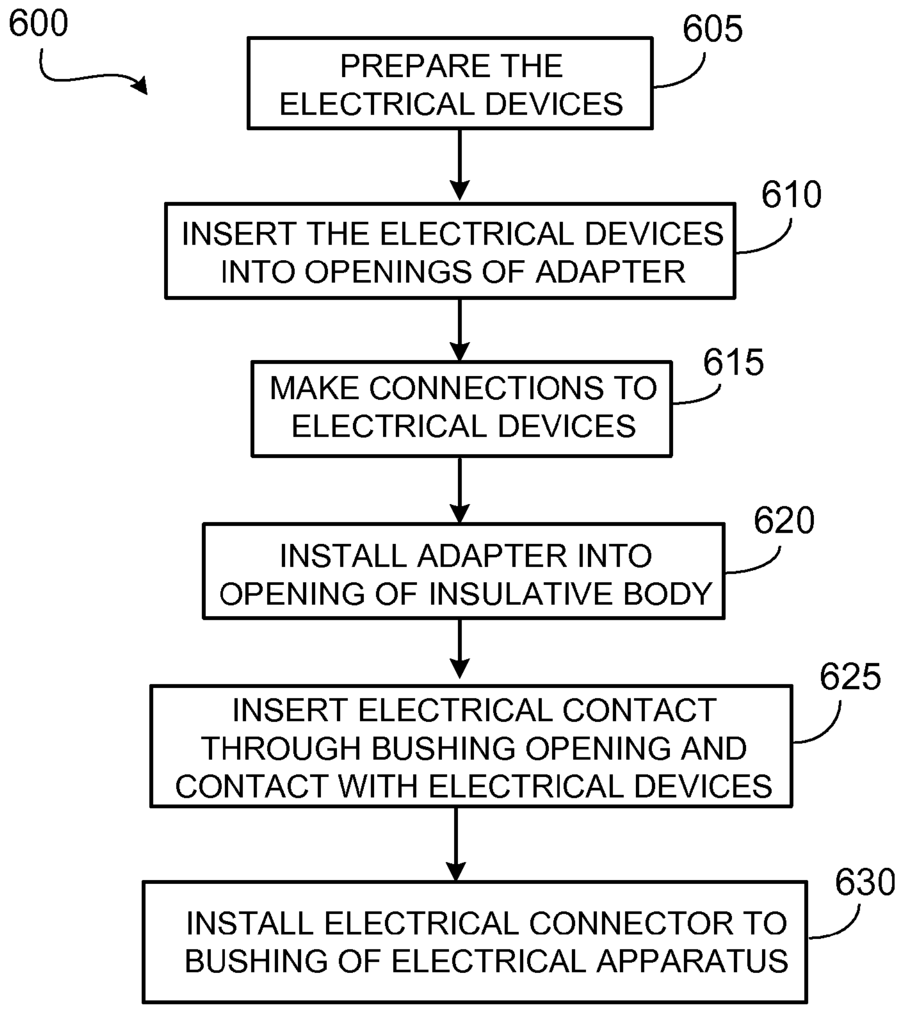
FIG. 6 is a flow chart of a procedure for assembling and installing the combination electrical connector of FIG. 1A.

Referring to FIG. 6, a procedure 600 is performed to assemble and install the electrical connector 100. Initially, the electrical devices 120, 125 are prepared (step 605). In particular, at this time, the electrical devices 120, 125 may be lubricated to facilitate insertion into the openings 155, 157. Also, if any of the electrical devices 120, 125 is a cable, then the outer appropriate layers of the cable are stripped to a proper stripback length. The devices 120, 125 are inserted into the openings 155, 157 to form an interference fit between the devices 120, 125 and the openings 155, 157 (step 610). Next, electrical connections are made to the devices 120, 125 (step 615). For example, if the devices 120, 125 are the cables 220, 225, then the connective devices (such as, for example, the devices 222 and 227) are installed or crimped to the exposed conductor (such as, for example, the conductor 285 and 287) of the cables. If any of the electrical devices 120, 125 is a surge arrester (such as the arrester 320), then the line lead 329 and the ground lead 333 are connected, respectively, to the compression device 331 and the cable neutral wires 370. After the electrical connections are made, an outer surface of the adapter 115 is lubricated and the adapter 115 (with the devices 120, 125) is inserted into the opening 149 (step 620). The electrical contact 110 is inserted through the opening 159 until an end of the contact 110 enters the coupling region 130 and makes electrical contact with the devices 120, 125 (step 625). For example, the threaded portion 240 of the contact 110 is threaded through the threaded portions 221, 226 of the connective devices 222, 227. The connector 100 is then inserted into the bushing 102 of the electrical apparatus 103 (step 630).

In other implementations, the cables 220, 225, or 325 may have other designs, as long as the cables 220, 225, and 325 enable current to travel from the electrical apparatus to which they are connected.

The adapter 115, 215, 315 may have an elliptical cross section (as shown in FIGS. 2B and 3B) or it may have any cross sectional geometry that enables both electrical devices to be inserted into the region 130, 230, 330. For example, the adapter 115, 215, 315 may have a circular, polygonal, or irregular cross section.

The connectors 100, 200, 300 may be designed to withstand high voltages and/or currents. For example, the connectors 100, 200, 300 may be designed for use with a 200 Amp loadbreak interface.

Figure 7:
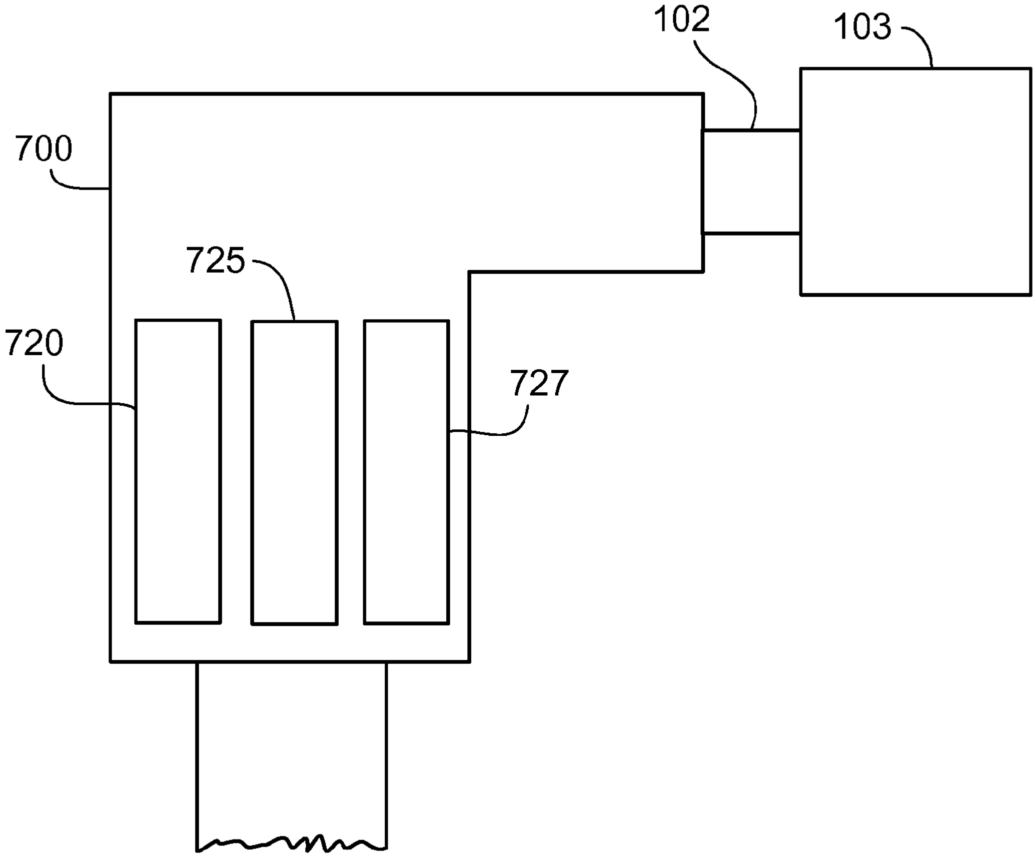
FIG. 7 is a block diagram of another implementation of a combination electrical connector that connects the electrical apparatus to the coupling device.

The combination electrical connector 100 may be configured to house more than two electrical devices or configurations of two electrical devices not shown above. In this case, the adapter 115 would need to be reconfigured to accept the more than two electrical devices. For example, as shown in FIG. 7, a combination electrical connector 700 includes three electrical devices 720, 725, 727 that are coupled to the electrical contact. The adapter (such as the adapter 115) would need to include three openings and be operatively sized to receive the three devices. The additional electrical devices may be passive or active. For example, the connector 100 may include two cables and a surge arrester. In this example, the line lead of the surge arrester would connect to the two cables and to the electrical contact 110 within the coupling region 130 and the ground lead of the surge arrester would connect to the neutral shield of one of the cables.

The electrical devices 120, 125 may be rated for currents higher than 200 Amps and voltages higher than 36.6 Kilovolts.

In another implementation, the two devices 120, 125 are two surge arresters connected in parallel. In this implementation, the hot leads of each of the surge arresters are coupled together in the coupling region 130 to the electrical contact 110 and the ground leads of each of the surge arresters are coupled to a ground of the electrical apparatus (such as the ground rod of a transformer). Such a design provides higher energy ratings.

In another implementation, the surge arrester 320 may be another protective device such as a circuit breaker, a fuse, a vacuum bottle, or a current-limiting fuse. The protective device would be in parallel with the other device (such as the cable) much like the surge arrester 320 is connected in parallel with the cable 325.

As shown above, the second direction is generally perpendicular to the first direction. However, the second direction may be any direction that is nonparallel to the first direction.

Other implementations are within the scope of the following claims.

What is claimed is:

1. An electrical connector for connecting to an electrical apparatus within a high power circuit, the electrical connector comprising:

an electrical contact configured to connect to a bushing of an electrical apparatus within a high power circuit, the electrical contact extending along a first direction from a coupling region; and an enclosure extending from the coupling region in a second direction that is nonparallel to the first direction, the enclosure including:

an insulative body, an adapter within the insulative body and having an adapter body that defines at least two internal openings, and two or more electrical devices, each electrical device being connected to the electrical contact within the coupling region and providing a current path from the electrical apparatus to at least one external coupling device within the high power circuit, wherein the at least two internal openings of the adapter body are shaped to receive the two or more electrical devices.

2. The electrical connector of claim 1 in which at least one of the electrical devices exits the enclosure outside of the coupling region.

3. The electrical connector of claim 1 in which at least one of the electrical devices comprises an insulated conductor.

4. The electrical connector of claim 3 in which another of the electrical devices comprises an insulated conductor that provides a second current path from the electrical apparatus to the external coupling device.

5. The electrical connector of claim 1 in which at least one of the electrical devices includes a protective device.

6. The electrical connector of claim 5 in which the protective device comprises a surge arrester.

7. The electrical connector of claim 6 in which another of the electrical devices comprises an insulated conductor and the surge arrester is electrically connected in parallel with the insulated conductor.

8. The electrical connector of claim 1 in which the second direction is perpendicular to the first direction.

9. The electrical connector of claim 1 further comprising a semiconductive insert that surrounds the coupling region.

10. The electrical connector of claim 1 in which the insulative body extends along the second direction within the enclosure and through the coupling region.

11. The electrical connector of claim 10 in which the insulative body extends from the coupling region along the first direction and around the electrical contact.

12. The electrical connector of claim 11 in which the insulative body defines a cavity that extends along the first direction and around the electrical contact, the cavity being shaped to receive the bushing.

13. The electrical connector of claim 10 further comprising a conductive shell that surrounds the insulative body.

14. The electrical connector of claim 1 in which the adapter surrounds the electrical devices.

15. An electrical connector for connecting an electrical apparatus within a high power circuit to an electrical implement coupled to the high power circuit and for providing overvoltage protection to the electrical implement, the connector comprising:

an electrical contact configured to connect to a bushing of an electrical apparatus within a high power circuit; and an enclosure including:

an insulative body, an adapter within the insulative body and having an adapter body that defines at least two internal openings, an electrical conductor that is electrically connected to the electrical contact within a coupling region, and a surge arrester within the enclosure and being electrically connected to the electrical contact within the coupling region to divert a current surge away from an electrical implement coupled to the electrical conductor, wherein the at least two internal openings of the adapter body are shaped to receive both the electrical conductor and the surge arrester.

16. The electrical connector of claim 15 further comprising a semiconductive insert that surrounds the coupling region.

17. The electrical connector of claim 15 in which the insulative body extends within the enclosure and through the coupling region.

18. The electrical connector of claim 17 in which the insulative body extends from the coupling region to define a cavity that surrounds the electrical contact, the cavity being shaped to receive the bushing.

19. The electrical connector of claim 17 further comprising a conductive shell that surrounds the insulative body.

20. The electrical connector of claim 15 wherein a distance between a line terminal of the surge arrester and the electrical conductor is less than approximately three inches.

21. The electrical connector of claim 15 wherein a distance between a ground terminal of the surge arrester and the electrical conductor is less than approximately six inches.

22. The electrical connector of claim 1 in which the adapter extends from the coupling region along only the second direction.

23. The electrical connector of claim 1 in which the adapter internal geometry is shaped to receive only the two or more electrical devices.

24. The electrical connector of claim 13 further comprising a plug having a first end that contacts the adapter and is within the conductive shell and a second end that protrudes from the conductive shell.

25. The electrical connector of claim 15 in which the adapter extends from the coupling region along only the second direction.

26. The electrical connector of claim 15 in which the adapter internal geometry is shaped to receive only the electrical conductor and the surge arrester.

27. The electrical connector of claim 19 further comprising a plug having a first end that contacts the adapter and is within the conductive shell and a second end that protrudes from the conductive shell.

* * * * *